US011142720B2

(12) United States Patent
Vadillo et al.

(10) Patent No.: US 11,142,720 B2
(45) Date of Patent: Oct. 12, 2021

(54) LUBRICANT SPRAY POLYMERS

(71) Applicant: NOURYON CHEMICALS INTERNATIONAL B.V., Arnhem (NL)

(72) Inventors: Damien Christian Vadillo, Franklin, NJ (US); Michael Timothy Philbin, Hopewell, NJ (US); John Socrates Thomaides, Berkeley Heights, NJ (US); Qiwei He, Belle Mead, NJ (US); Philip Nigel Threlfall-Holmes, Liverpool (GB)

(73) Assignee: NOURYON CHEMICALS INTERNATIONAL B.V., Arnhem (NL)

( * ) Notice: Subject to any disclaimer, the term of this patent is extended or adjusted under 35 U.S.C. 154(b) by 0 days.

(21) Appl. No.: 16/854,080

(22) Filed: Apr. 21, 2020

(65) Prior Publication Data

US 2020/0248094 A1 Aug. 6, 2020

Related U.S. Application Data

(63) Continuation of application No. 16/309,128, filed as application No. PCT/EP2017/064756 on Jun. 16, 2017, now abandoned.

(60) Provisional application No. 62/351,457, filed on Jun. 17, 2016.

(30) Foreign Application Priority Data

Jul. 27, 2016 (EP) .................................. 16181355

(51) Int. Cl.
*C10M 145/14* (2006.01)
*C08F 297/02* (2006.01)
*C08F 220/18* (2006.01)

(52) U.S. Cl.
CPC ......... *C10M 145/14* (2013.01); *C08F 220/18* (2013.01); *C08F 297/026* (2013.01); *C08F 220/1806* (2020.02); *C08F 220/1812* (2020.02); *C08F 2800/20* (2013.01); *C10M 2209/084* (2013.01)

(58) Field of Classification Search
CPC ........... C10M 145/14; C10M 2209/084; C08F 2220/1883
See application file for complete search history.

(56) References Cited

U.S. PATENT DOCUMENTS

| | | | |
|---|---|---|---|
| 3,299,018 A | 1/1967 | Freedman et al. | |
| 3,912,667 A | 10/1975 | Spitzer et al. | |
| 4,136,047 A | 1/1979 | Rogan et al. | |
| 4,496,691 A | 1/1985 | Proux et al. | |
| 4,529,656 A | 7/1985 | Haigh et al. | |
| 5,302,486 A | 4/1994 | Patel et al. | |
| 5,763,374 A | 6/1998 | Sakai et al. | |
| 6,124,249 A | 9/2000 | Seebauer et al. | |
| 6,228,819 B1 | 5/2001 | Shauber | |
| 7,135,506 B2 | 11/2006 | Horie et al. | |
| 8,778,857 B2 | 7/2014 | Growcott | |
| 9,175,242 B2 | 11/2015 | Radano et al. | |
| 9,617,495 B2 | 4/2017 | Ghahary et al. | |
| 2009/0209440 A1 | 8/2009 | Tipton et al. | |
| 2010/0004149 A1 | 1/2010 | Johnson et al. | |
| 2010/0178498 A1 | 7/2010 | Imai et al. | |
| 2012/0135899 A1 | 5/2012 | Kocsis et al. | |
| 2012/0135902 A1 | 5/2012 | Baum et al. | |
| 2012/0245068 A1 | 9/2012 | Scanlon et al. | |
| 2013/0310291 A1 | 11/2013 | Baum et al. | |
| 2014/0005087 A1 | 1/2014 | Doan et al. | |
| 2016/0168504 A1 | 6/2016 | Lee | |

FOREIGN PATENT DOCUMENTS

| | | |
|---|---|---|
| CN | 102858928 A | 1/2013 |
| CN | 105524209 A | 4/2016 |
| GB | 671250 | 4/1952 |
| GB | 814572 | 6/1959 |
| GB | 1172697 | 12/1969 |
| JP | H01254703 A | 10/1989 |
| JP | 2000155322 A | 6/2000 |
| JP | 2002090753 A | 3/2002 |
| JP | 2003127521 | 5/2003 |
| JP | 2007238643 | 9/2007 |
| RU | 2576401 C2 | 3/2016 |
| WO | 2006047393 A1 | 5/2006 |
| WO | 2008058108 A2 | 5/2008 |

(Continued)

OTHER PUBLICATIONS

Muraki et al., "Shear behavior of polyalkylmethacrylate solutions under thin film lubrication", Proc. IMechE vol. 225 PartJ: J. EnQineerinQ TriboIOQY, 2010, downloaded 2015.
EPO, Extended European Search Report issued in counterpart European Application No. 16181355.5-1370 dated Feb. 2, 2017.
ISA-EPO, International Search Report and Written Opinion issued in International Application No. PCT/EP2017/064756 dated Sep. 8, 2017.
CAS Abstract for CS 152187 B1 (patent dated Dec. 19, 1973), HCAPLUS © 2015 ACS on STN.
CAS Abstract for EG 24243 A (published on Nov. 19, 2008), 2015, American Chemical Society (ACS).

(Continued)

*Primary Examiner* — Wenwen Cai
(74) *Attorney, Agent, or Firm* — Lorenz & Kopf, LLP

(57) ABSTRACT

Disclosed are copolymers of alkyl methacrylate monomers wherein said alkyl methacrylate monomers comprise at least:
a. Monomers (A) selected from C6-C10 alkyl methacrylate monomers, and
b. Monomers (B) selected from C10-C18 alkyl methacrylate monomers, wherein the mass ratio of Monomers (B) in the copolymer to Monomers (A) in the copolymer is about 99:1 to about 60:40 by weight. In some cases, the copolymers are of lauryl methacrylate and $C_8$alkyl methacrylate. Also disclosed are methods for the preparation of the copolymers.

20 Claims, No Drawings

(56) References Cited

FOREIGN PATENT DOCUMENTS

WO    2014186318 A1    11/2014

OTHER PUBLICATIONS

CAS Abstract for RO 88424 A2 (published on Jan. 30, 1986), 2015, American Chemical Society (ACS).
CAS Abstract for JPH01-254703 A (Published on Oct. 11, 1989), HCAPLUS © 2015 ACS on STN.
CAS Abstract for JP2000-155322A (Published on Jun. 6, 2000), HCAPLUS © 2015 ACS on STN.
CAS Abstract for JP2002-090753 A (Published on Mar. 27, 2002), HCAPLUS © 2015 ACS on STN.

LUBRICANT SPRAY POLYMERS

CROSS REFERENCE TO RELATED APPLICATIONS

The subject application is a continuation of U.S. patent application Ser. No. 16/309,128 filed on Dec. 12, 2018, which is the national stage filing under 35 U.S.C. § 371 of International Patent Application No. PCT/EP2017/064756 filed Jun. 16, 2017, which claims priority to U.S. Provisional Application No. 62/351,457 filed Jun. 17, 2016 and European Patent Application No. 16181355.5 filed Jul. 27, 2016, the contents of which are incorporated herein by reference in their entirety.

FIELD OF INVENTION

This invention relates to a copolymer, its synthesis and methods of using it.

TECHNICAL BACKGROUND

The primary function of lubricants is to decrease friction. Frequently, however, lubricating oils need additional properties to be used effectively. For example, lubricants used in the crankcases of large diesel engines, such as, for example, marine diesel engines, are often subjected to operating conditions requiring special considerations.

Marine diesel engines may generally be classified as slow-speed, medium-speed, or high-speed engines, with the slow-speed variety being used for the largest, deep shaft marine vessels and certain other industrial applications. Slow-speed diesel engines are unique in size and method of operation. The larger units may approach 200 tons in weight and be upward of 10 feet wide and 45 feet high. The output of these engines can be as high as 100,000 horsepower with engine revolutions of 60 to about 200 revolutions per minute. They are typically of crosshead design and operate on a two-stroke cycle.

In large diesel engines of the crosshead type used in marine and heavy stationary applications, the piston cylinders are lubricated separately from the other engine components. The cylinders are lubricated on a total loss basis with the cylinder oil being injected separately into each cylinder by means of lubricators positioned around the cylinder liner. OH is distributed to the lubricators by means of pumps, which are, in modern engine designs, actuated to apply the oil directly onto the rings to reduce oil wastage.

The unique design of these engines creates the need for lubricants with enhanced rheology properties. Because slow-speed engines run at a lower temperature than mid- or fast-speed engines, they are more prone to corrosion. Accordingly, lubricants used in a marine engine must protect the engine parts from corrosion, especially rust. Rust is produced when ferrous metal engine components come in contact with water, which is typically produced by the internal combustion process or from external sources. Regardless of the source, rust and corrosion reduce engine efficiency and lifetime.

Also, the fuels commonly used in these diesel engines typically contain significant quantities of sulfur. During the combustion process, the sulfur can combine with water to form sulfuric acid, the presence of which leads to corrosive wear. In particular, in two-stroke engines for ships, areas around the cylinder liners and piston rings can be corroded and worn by the acid. Therefore, it is important for diesel engine to resist such corrosion and wear by being properly lubricated.

To prevent corrosion, the lubricant must be applied to the cylinder wall, typically by a pulse lubricating system or by spraying the lubricant onto the cylinder wall through an injector. In marine engines the lubricant is injected or sprayed on the cylinder liner and spread horizontally by the sprayer or injector and vertically by the piston rings when the piston is in its upward motion. The lubricant is not used in a circulating system; when the excess lubricant comes to the bottom of cylinder it is discarded. Typically fresh lubricant is injected every four to eight strokes depending on the engine speed.

Thus, there is a need for a lubricant additive that will provide effective oxidation and corrosion resistance without posing the environmental hazards and cost of other oxidation and corrosion inhibitors. Additionally, because the lubricating oil is not circulated in marine engines, any rheology improvements that enhance lubricating efficacy or reduce the amount of oil used could significantly increase engine life and decrease costs.

SUMMARY

We have found new copolymers that can modify the rheology of a marine lubricant to provide enhanced lubrication properties. In particular, marine engine lubricating oils comprising the copolymers of the disclosure as an additive surprisingly cover marine engine piston cylinder walls more completely than prior art oils (with or without additional additives), thereby leading to better lubrication and less engine cylinder wear and corrosion.

We have also recognized that the method in which the copolymer is made can control the properties of the copolymer.

In a first aspect, the present disclosure provides a copolymer of alkyl methacrylate monomers wherein said alkyl methacrylate monomers comprise at least:

a. Monomers (A) selected from C6-C10 alkyl methacrylate monomers, and b. Monomers (B) selected from C10-C18 alkyl methacrylate monomers. The ratio of Monomers (B) in the copolymer to Monomers (A) in the copolymer is about 99:1 to about 10:90 by weight. In an embodiment, A is selected from C6-C9 alkyl methacrylate monomers. In another embodiment, B is selected from C11-C18 alkyl methacrylate monomers. In another embodiment, the ratio of Monomers (B) in the copolymer to Monomers (A) in the copolymer is about 99:1 to about 60:40 by weight.

In a second aspect, the present disclosure provides a copolymer obtained by combining at least Monomers (A) and Monomers (B) in a mixture and co-polymerizing the monomers, wherein the monomers are present in a mass ratio of about 99:1 to about 10:90, preferably about 99:1 to about 60:40, Monomers (B) to Monomers (A), and wherein Monomers (A) and Monomers (B) are distinct from one another.

In a third aspect, the present disclosure provides a method of making a copolymer as described above.

All publications referenced herein are incorporated by reference in their entirety to the extent they are not inconsistent with the teachings presented herein.

DETAILED DESCRIPTION

In the first aspect, the present disclosure provides a copolymer of alkyl methacrylate monomers wherein said alkyl methacrylate monomers comprise at least:

a. Monomers (A) selected from C6-C10 alkyl methacrylate monomers, and b. Monomers (B) selected from O10-C18 alkyl methacrylate monomers, wherein the mass ratio of Monomers (B) in the copolymer to Monomers (A) in the copolymer is about 99:1 to about 10:90, preferably 99:1 to 60:40, by weight.

The ratio of monomers in all aspects of the disclosure can be adjusted to manipulate the characteristics of the copolymer as desired. For example, the monomers can be present in ratios of Monomers (B) to Monomers (A) of 10:90, 15:85, 20:80, 25:75, 30:70, 35:65, 40:60, 45:55, 50:50, 55:45, 60:40, 65:35, 70:30, 75:25, 80:20, 85:15, 90:10, 95:5, and 99:1. In one embodiment, the monomers are present in ratios of Monomers (B) to Monomers (A) of 60:40, 65:35, 70:30, 75:25, 80:20, 85:15, 90:10, 95:5, and 99:1.

In some embodiments of all aspects of the disclosure, the Monomers (A) are linear or branched $C_8$ alkyl. In some embodiments, Monomers (A) are 2-ethylhexyl methacrylate.

In some embodiments of all aspects of the disclosure, the copolymer used in the lubricant composition according to the invention is prepared from a mixture of monomers that comprises at least two monomers: one monomer (A) and one monomer (B), distinct from one another. The monomers are preferably chosen from monomers which, when polymerized, form a copolymer that is soluble in liquid, preferably in oil, more preferably in marine diesel engine oil lubricants.

In another embodiment of all aspects of the disclosure, the copolymer is a copolymer of a mixture of monomers comprising at least: a C8 alkyl methacrylate, a C12 alkyl methacrylate, a C14 alkyl methacrylate, and a C16 alkyl methacrylate, and they are present in the mixture in weight ratio of:

from 5 to 30% C8 alkyl methacrylate,
from 40 to 70% C12 alkyl methacrylate,
from 12 to 35% C14 alkyl methacrylate,
from 1 to 12% C16 alkyl methacrylate,
from 0.1 to 15%, preferably from 0.5 to 10%, more preferably from 1 to 5% other methacrylates, by weight with regard to the total weight of the mixture.

In another embodiment of all aspects of the disclosure, the copolymer is substantially free of monomers other than monomer (A) and monomer (B), particularly free of methacrylates having a C1-C5 alkyl group, including, for example, methyl methacrylate. Monomers such as methyl methacrylate decrease the solubility of the resulting copolymer in oil, and the presence of such monomers are limited or omitted in some embodiments.

In another embodiment of all aspects of the disclosure, the copolymer is free of methacrylates other than monomer (A) and monomer (B), particularly methacrylates having a C1-C5 alkyl group, including, for example, methyl methacrylate.

Typically, copolymers according to the disclosure have an average Root Mean Square Radius of Gyration (Rg) as measured by Hydrodynamic Column Chromatography-Multi Angle Light Scattering (HCC-MALS) from about 100 to about 200 (nm) Rg, from about 120 to about 190 (nm), from about 130 to 180, or from about 140 to about 170 (nm) Rg.

In the second aspect, the copolymer is obtained by combining at least Monomers (B) and Monomers (A) in a mixture and co-polymerizing the monomers, wherein the monomers are present in a mass ratio of about 99:1 to about 10:90 Monomers (B) to Monomers (A).

The copolymer may be synthesized by conventional methods for vinyl addition polymerization known to those skilled in the art, such as, but not limited to, solution polymerization, precipitation polymerization, and dispersion polymerizations, including suspension polymerization and emulsion polymerization.

In some embodiments, the polymer is formed by suspension polymerization, wherein monomers that are insoluble in water or poorly soluble in water are suspended as droplets in water. The monomer droplet suspension is maintained by mechanical agitation and the addition of stabilizers. Surface active polymers such as cellulose ethers, poly(vinyl alcohol-co-vinyl acetate), poly(vinyl pyrrolidone) and alkali metal salts of (meth)acrylic acid containing polymers and colloidal (water insoluble) inorganic powders such as tricalcium phosphate, hydroxyapatite, barium sulfate, kaolin, and magnesium silicates can be used as stabilizers. In addition, small amounts of surfactants such as sodium dodecylbenzene sulfonate can be used together with the stabilizer(s). Polymerization is initiated using an oil soluble initiator. Suitable initiators include peroxides such as benzoyl peroxide, peroxy esters such as tert-butylperoxy-2-ethylhexanoate, and azo compounds such as 2,2'-azobis(2-methylbutyronitrile). At the completion of the polymerization, solid polymer product can be separated from the reaction medium by filtration and washed with water, acid, base, or solvent to remove unreacted monomer or free stabilizer.

In other embodiments the polymer is formed by emulsion polymerization, one or more monomers are dispersed in an aqueous phase and polymerization is initiated using a water soluble initiator. The monomers are typically water insoluble or very poorly soluble in water, and a surfactant or soap is used to stabilize the monomer droplets in the aqueous phase. Polymerization occurs in the swollen micelles and latex particles. Other ingredients that might be present in an emulsion polymerization include chain transfer agents such as mercaptans (e.g. dodecyl mercaptan) to control molecular weight, electrolytes to control pH, and small amounts of organic solvent, preferably water soluble organic solvents, including but not limited to acetone, b-butanone, methanol, ethanol, and isopropanol, to adjust the polarity of the aqueous phase. Suitable initiators include alkali metal or ammonium salts of persulfate such as ammonium persulfate, water-soluble azo compounds such as 2,2'-azobis(2-aminopropane)dihydrochloride, and redox systems such as Fe(II) and cumene hydroperoxide, and tert-butyl hydroperoxide-Fe(II)-sodium ascorbate. Suitable surfactants include anionic surfactants such as fatty acid soaps (e.g. sodium or potassium stearate), sulfates and sulfonates (e.g. sodium dodecyl 20 benzene sulfonate), sulfosuccinates (e.g. dioctyl sodium sulfosuccinate); non-ionic surfactants such as octylphenol ethoxylates and linear and branched alcohol ethoxylates; cationic surfactants such as cetyl trimethyl ammonium chloride; and amphoteric surfactants. Anionic surfactants and combinations of anionic surfactants and non-ionic surfactants are most commonly used. Polymeric stabilizers such as poly(vinyl alcohol-co-vinyl acetate) can also be used as surfactants. The solid polymer product free of the aqueous medium can be obtained by a number of processes including destabilization/coagulation of the final emulsion followed by filtration, solvent precipitation of the polymer from latex, or spray drying of the latex.

The polymer can be isolated by conventional methods known to those skilled in the art, such as, but not limited to, solvent exchange, evaporation of solvent, spray drying and freeze-drying.

The characteristics of the copolymer obtained by combining at least Monomers (A) and Monomers (B) in a mixture and co-polymerizing can be manipulated by controlling the additional reagents added to the polymerization mixture. These reagents include, but are not limited to, initiator systems and surfactants.

The type and amount initiator system used in the polymerization mixture can influence the properties of the resulting copolymer. An initiator system can be a single initiator compound (e.g., a persulfate salt) or a mixture of two or more components (e.g., hydrogen peroxide and sodium ascorbate). In some examples, the initiator system can include an oxidant, reductant, and optionally a metal salt. The oxidant can be a persulfate, such as, for example, ammonium persulfate, or a peroxide, such as, for example, hydrogen peroxide ($H_2O_2$) or tert-butyl hydroperoxide (TBHP). A desirable copolymer may be obtained, for example, when the polymerization mixture includes tert-butyl hydroperoxide in about 0.01 to about 0.06 mass percent of all monomers in the mixture. In other examples, the mixture may include tert-butyl hydroperoxide in about 0.01 to about 0.03 mass percent of the monomers in the mixture. In some examples, the mixture further comprises tert-butyl hydroperoxide in about 0.013 mass percent of the monomers in the mixture. Useful initiators for the copolymers of the present disclosure include any conventional initiator, including any conventional redox initiator.

In some embodiments the reductant of the redox initiator system can be ascorbic acid or a salt thereof. For example, the polymerization mixture can include sodium ascorbate in about 0.04 to about 0.1 mass percent of the monomers in the mixture. In other examples, the sodium ascorbate may be present in about 0.08 to about 0.1 mass percent of the monomers in the mixture. In some embodiments, the polymerization mixture includes sodium ascorbate in about 0.098 mass percent of the monomers in the mixture.

The initiator system may also include a metal salt. The metal may be any suitable transition metal, such as, for example, iron. In some embodiments, the metal salt of the initiator system can be ferrous sulfate ($FeSO_4$). In some embodiments, the metal salt is present in the polymerization mixture in about 0.0005 to about 0.1 mass percent of the monomers in the mixture. In some examples, the metal salt is added to the polymerization mixture as a solution.

The copolymer may also be obtained for a polymerization mixture further including a surfactant. In some embodiments, the surfactant may contain a sulfonate group. For example, the surfactant may include a dialkyl sulfosuccinate, such as, for example, dioctyl sulfosuccinate sodium salt. In some examples, the surfactant may be Aerosol® OT.

The copolymer can be a random copolymer, block copolymer, or mixture thereof. In some embodiments, the copolymer is a substantially random copolymer (e.g., greater than 90, 95, 98, or 99 mass percent). In other examples, the copolymer is a partially a random copolymer and partially a block copolymer. In these examples the weight percent ratio of random copolymer to block copolymer is generally 90:10, 80:20, 70:30, 60:40, 50:50, 40:60, 30:70; 20:80 or 10:90. The copolymer may also be a substantially block copolymer (e.g., greater than 90, 95, 98, or 99 weight percent). In other examples, the copolymer can contain additional monomers in addition to Monomers (A) and Monomers (B) discussed. These additional monomers can be present in an amount less than 10 weight percent. In some embodiments, the additional monomers are present in an amount from about 0.5 to 10 weight percent, or about 1 to 10 weight percent or about 1 to 5 weight percent or about 5 to 10 weight percent. In other embodiments, the additional monomers are present in an amount less than about 10, 9, 8, 7, 6, 5, 4, 3, 2, 1 or about 0.5 weight percent. The additional monomers can include, for example, cross-linking monomers, acrylate, styrene, $C_1$-$C_3$ alkyl methacrylate and other similar monomers.

The copolymer may also be crosslinked. That is, the copolymer can contain monomeric units that connect one or more of the backbone chains of the polymer. In some examples, the copolymer contains crosslinked monomeric units present in up to about 5% by weight of the copolymer. In other embodiments, the copolymer is not crosslinked, or uncrosslinked, and is substantially free of monomers that function as a crosslinking agent. In other embodiments, the monomer mixture to make the copolymer is substantially free of crosslinking agents.

The crosslinked copolymer may be obtained when the polymerization mixture includes a crosslinking agent. In some embodiments, the crosslinking agent is a diacrylate or dimethacrylate crosslinking agent, such as, for example, 1,6-hexanediol dimethacrylate. In some examples, the mixture includes a crosslinking agent in up to about 0.005 mass percent of the monomers in the mixture.

Example copolymers are shown in Tables 1 and 2. For each example, Table 1 shows the ratio of Monomers (B) to Monomers (A) (e.g., 2-ethylhexyl methacrylate), and the amount of acetone, the components of the redox initiator system and surfactant used. Table 2 shows the molecular weight, Rg and viscosity of each example copolymer.

In a third aspect, a method of making a copolymer as described above is disclosed. The method includes the polymerization of Monomers (A) and a Monomers (B), wherein the mass ratio of Monomers (B) in the copolymer to Monomers (A) in the copolymer is about 99:1 to about 10:90 by weight (e.g., 10:90, 15:85, 20:80, 25:75, 30:70, 35:65, 40:60, 45:55, 50:50, 55:45, 60:40, 65:35, 70:30, 75:25, 80:20, 85:15, 90:10, 95:5, 99:1).

In some embodiments, the method includes: combining Monomers (B) and Monomers (A) in a ratio of about 10:90, 15:85, 20:80, 25:75, 30:70, 35:65, 40:60, 45:55, 50:50, 55:45, 60:40, 65:35, 70:30, 75:25, 80:20, 85:15, 90:10, 95:5, 99:1 and initiating the polymerization of the monomers to provide a copolymer.

In some embodiments, the ratio of monomers and the initiator, or initiator system, can be selected as described above. The method may include further components to provide a copolymer with desirable properties. For example, the method may include a surfactant, such as, for example, Aerosol® OT, or a crosslinker, such as, for example, 1,6-hexanediol dimethacrylate.

Polymerization can occur in an aqueous mixture or a mixture that comprises both aqueous and organic solvents. For example, the polymerization mixture can include a mixture of water and acetone. In some embodiments the polymerization mixture may require an organic solvent. Often it will be desirable to include an organic solvent when lauryl methacrylate is in the polymerization mixture. Organic solvents for use in such polymerization reactions are known and routinely selectable by those of ordinary skill in the field of polymer synthesis. Suitable organic solvents include, for example and without limitation, acetone, 2-butanone, methanol, ethanol, and isopropanol.

The copolymer of the first or second aspect can be present in the oil in an amount from about 0.5% to about 25% by weight. Depending on the oil used the, the copolymer may be present in the oil in an amount from about 1% to about 25.

The oil may be selected from those known in the art, and may be a mineral oil, i.e., those obtained from the processing of crude oil, or a synthetic oil, i.e., an artificially made oil typically containing polyglycols or esters, or a semi-synthetic oil, i.e., a blend of mineral and synthetic oils. In some embodiments, the oil is a mineral base oil, i.e., a complex mixture of paraffins, naphthenes, and aromatics. In some examples, the oil may be a paraffinic base oil, such as 150 Neutral Solvent, 600 Solvent Neutral or a bright stock. The oil composition may include further components, particularly those used in marine diesel engine oil lubricants.

A test measuring the enhanced lubrication properties and usability of oil containing a copolymer of the first or second aspect was undertaken under the following conditions. The oil/polymer compositions were examined for performance/suitability as a lubricant by a finger pull test, which is performed by pipetting a droplet of sample fluid (about 65 µl) onto the thumb of a gloved hand. The thumb and forefinger are gently squeezed together to ensure contact of the droplet with both fingers, and then the fingers are pulled apart vertically for about 1 second over a distance of about 7.5 cm., while observing the amount of time the composition provides a fluid connection between the thumb and forefinger once the fingers are moved apart. All finger pull tests were performed at ambient temperature, about 21° C. The performance of the sample was characterized as "very short," "short," "medium," "long," or "very long" depending upon the duration that the sample provided a fluid connection between thumb and forefinger remain. Compositions with "very short" performance in the finger pull test being less than 1 second, "short" ranging from 1-4 seconds, "medium" ranging from 4-7 seconds, "long" ranging from 7-60 seconds, and "very long" describing the situation where the composition remains connected to both fingers indefinitely. Compositions with "very short" and "very long" textures do not exhibit enhanced suitability or performance as a lubricant. Compositions with "short," "medium," or "long" textures exhibit improved suitability as a lubricant to varying degrees because, for example, their ability to effectively spread on the cylinder wall of the engine being lubricated is enhanced. Compositions with "long" texture have particularly good suitability as a lubricant. The results of the finger pull test are shown in Table 2.

One advantage of the copolymers disclosed herein is that they can be used to enhance the performance of an oil as a lubricant, while at the same time maintaining the ability to handle the oil in a manner necessary for use in the field. For example, many lubricants are pumped via a fluid pump, and therefore the lubricant should have an appropriate viscosity to allow it to be pumped without creating mechanical complications or damage to the pumping equipment. A lubricant with improper viscosity (particularly a viscosity that is too high) can prevent the lubricant from being pumped properly, or otherwise require the exertion of much higher power to pump the lubricant. The polymers disclosed herein maintain the balance between enhancing lubricant oil performance while at the same time maintaining the viscosity at a sufficient level to allow for efficient handling in the field. It has been unexpectedly discovered that the combination of Monomer B homopolymer with oil also provides enhanced lubricant performance at a viscosity that allows for efficient handling. The combination of oil with a copolymer having a 5:95 Monomer B to Monomer A ratio results in a substance having a viscosity and other physical handling properties that prevent this composition from being efficiently handled in the field.

In an embodiment the polymers have a molecular weight>20000 D.

In an embodiment the polymers have a bimodal molecular weight distribution.

Copolymers having a molecular weight (Mw), average root mean square radius of gyration (Rg) and viscosity correlation in a certain range are particularly suitable as an oil additive to enhance the performance of oil as a lubricant while maintaining the ability to handle and pump the oil. A preferred correlation of a bimodal Mw, Rg and viscosity values for one embodiment of the copolymers disclosed herein is represented by the following formula:

Performance X=1139.69418+(2.54756*Peak 1 Mw)−(0.91396*Peak 1 Rg)−(66.18535*Peak 2 Mw)−(0.23020*Viscosity+1.18947E-003*Peak 1 Rg)*(Viscosity), where the units for Mw is $10^6$ g/mol, Rg is nm, and Viscosity is mPa·s, as set forth in Table 2. A performance X value between 500 and 900, more preferably between 550 and 800, and most preferably between 600 and 750 is indicative of a copolymer having properties that are particularly suitable to enhance the performance of oil as a lubricant.

Definitions

As used herein, lauryl methacrylate is dodecyl methacrylate ($C_{12}$; CAS 142-90-5) or a mixture of 014-16alkyl methacrylates including dodecyl methacrylate. That is, lauryl methacrylate may include a mixture of which dodecyl methacrylate is a component, but which also includes one or more other $C_{14-16}$alkyl methacrylates such as tetradecyl methacrylate ($C_{14}$; CAS 2549-53-3) and hexdecyl methacrylate ($C_{16}$; CAS 2495-27-4). For example, the lauryl methacrylate could be a mixture of about 40-70 weight percent dodecyl methacrylate, 15-40 weight percent tetradecyl methacrylate, and 4-10 weight percent hexdecyl methacrylate, such as commercially available methacrylic ester 13.0 (Evonik trade name: VISIOMER® Terra C13.0-MA).

As used herein, the term "about" refers to the given value±10% of the value.

As used herein, the term "$C_8$alkyl" refers to a group comprised of eight saturated carbon atoms connected in a linear or branched configuration. Examples of linear $C_8$alkyl groups include n-octyl. Examples of branched $C_8$alkyl groups include, but are not limited, to 2-ethylhexyl.

As used herein, the term "alkyl methacrylate" refers to compounds wherein a methacrylol radical is bonded to a linear or branched, saturated or unsaturated alkyl group.

As used herein, the term "substantially free of monomers" means that there is no more than 3.0% by weight of the copolymer, preferably no more than 1.0% by weight, and more preferably no more than 0.5% by weight of the monomer present in the copolymer.

As used herein, the term "substantially free of crosslinking agents" means that there is no more than 1.0% by weight of the copolymer, preferably no more than 0.5% by weight, of monomeric units that connect two or more of the backbone chains of the polymer.

It is noted that any embodiment disclosed herein can be combined with any other embodiment with the result being subject matter in accordance with the invention.

It is noted that, unless use differently, "%" means percent by weight.

EXAMPLES

Lauryl methacrylate as used in Examples 1-8 was provided as methacrylic ester 13.0, which is commercially available as VISIOMER Terra C13.0-MA from Evonik Industries.

Example 1

To a 4-neck 2000 mL flask equipped with an overhead stirrer, a condenser, a thermocouple and a subsurface nitrogen purge was added 645.5 g of water and 8.7 g of Aerosol® OT. The stirring was turned up to 200 rpm and the subsurface nitrogen purge was started. To the reaction was then added container 270.0 g of lauryl methacrylate, 30.0 g of 2-ethylhexyl methacrylate and 129.9 g of acetone. The reaction was heated up to 43° C. by using a temperature controlled water batch set at 45° C. Once the reaction reached 43° C., 0.04 g of t-butyl hydroperoxide in 7.5 g of water was added. After 5 minutes, 0.29 g of sodium ascorbate dissolved in 7.5 g of water and 0.60 g of a 0.25% solution of iron sulfate hexahydrate was added. The nitrogen purge was then changed to a nitrogen blanket. The reaction was held an additional 5 hours, cooled to room temperature and isolated.

Example 2

To a 4-neck 2000 mL flask equipped with an overhead stirrer, a condenser, a thermocouple and a subsurface nitrogen purge was added 645.5 g of water and 8.7 g of Aerosol® OT. The stirring was turned up to 200 rpm and the subsurface nitrogen purge was started. To the reaction was then added container 240.0 g of lauryl methacrylate, 60.0 g of 2-ethylhexyl methacrylate and 129.9 g of acetone. The reaction was heated up to 43° C. by using a temperature controlled water batch set at 45° C. Once the reaction reached 43° C., 0.04 g of t-butyl hydroperoxide in 7.5 g of water was added. After 5 minutes, 0.29 g of sodium ascorbate dissolved in 7.5 g of water and 0.60 g of a 0.25% solution of iron sulfate hexahydrate was added. The nitrogen purge was then changed to a nitrogen blanket. The reaction was held an additional 5 hours, cooled to room temperature and isolated.

Example 3

To a 4-neck 2000 mL flask equipped with an overhead stirrer, a condenser, a thermocouple and a subsurface nitrogen purge was added 645.5 g of water and 8.7 g of Aerosol® OT. The stirring was turned up to 200 rpm and the subsurface nitrogen purge was started. To the reaction was then added container 210.0 g of lauryl methacrylate, 90.0 g of 2-ethylhexyl methacrylate and 129.9 g of acetone. The reaction was heated up to 43° C. by using a temperature controlled water batch set at 45° C. Once the reaction reached 43° C., 0.04 g of t-butyl hydroperoxide in 7.5 g of water was added. After 5 minutes, 0.29 g of sodium ascorbate dissolved in 7.5 g of water and 0.60 g of a 0.25% solution of iron sulfate hexahydrate was added. The nitrogen purge was then changed to a nitrogen blanket. The reaction was held an additional 5 hours, cooled to room temperature and isolated.

Example 4

To a 4-neck 2000 mL flask equipped with an overhead stirrer, a condenser, a thermocouple and a subsurface nitrogen purge was added 645.5 g of water and 8.7 g of Aerosol® OT. The stirring was turned up to 200 rpm and the subsurface nitrogen purge was started. To the reaction was then added container 180.0 g of lauryl methacrylate, 120.0 g of 2-Ethylhexyl Methacrylate and 129.9 g of acetone. The reaction was heated up to 43° C. by using a temperature controlled water batch set at 45° C. Once the reaction reached 43° C., 0.04 g of t-butyl hydroperoxide in 7.5 g of water was added. After 5 minutes, 0.29 g of sodium ascorbate dissolved in 7.5 g of water and 0.60 g of a 0.25% solution of iron sulfate hexahydrate was added. The nitrogen purge was then changed to a nitrogen blanket. The reaction was held an additional 5 hours, cooled to room temperature and isolated.

Example 5

To a 4-neck 2000 mL flask equipped with an overhead stirrer, a condenser, a thermocouple and a subsurface nitrogen purge was added 645.5 g of water and 8.7 g of Aerosol® OT. The stirring was turned up to 200 rpm and the subsurface nitrogen purge was started. To the reaction was then added container 120.0 g of lauryl methacrylate, 180.0 g of 2-Ethylhexyl Methacrylate and 129.9 g of acetone. The reaction was heated up to 43° C. by using a temperature controlled water batch set at 45° C. Once the reaction reached 43° C., 0.04 g of t-butyl hydroperoxide in 7.5 g of water was added. After 5 minutes, 0.29 g of sodium ascorbate dissolved in 7.5 g of water and 0.60 g of a 0.25% solution of iron sulfate hexahydrate was added. The nitrogen purge was then changed to a nitrogen blanket. The reaction was held an additional 5 hours, cooled to room temperature and isolated.

Example 6

To a 4-neck 2000 mL flask equipped with an overhead stirrer, a condenser, a thermocouple and a subsurface nitrogen purge was added 645.5 g of water and 8.7 g of Aerosol® OT. The stirring was turned up to 200 rpm and the subsurface nitrogen purge was started. To the reaction was then added container 60.0 g of lauryl methacrylate, 240.0 g of 2-Ethylhexyl Methacrylate and 129.9 g of acetone. The reaction was heated up to 43° C. by using a temperature controlled water batch set at 45° C. Once the reaction reached 43° C., 0.04 g of t-butyl hydroperoxide in 7.5 g of water was added. After 5 minutes, 0.29 g of sodium ascorbate dissolved in 7.5 g of water and 0.60 g of a 0.25% solution of iron sulfate hexahydrate was added. The nitrogen purge was then changed to a nitrogen blanket. The reaction was held an additional 5 hours, cooled to room temperature and isolated.

Example 7

To a 4-neck 2000 mL flask equipped with an overhead stirrer, a condenser, a thermocouple and a subsurface nitrogen purge was added 645.5 g of water and 8.7 g of Aerosol® OT. The stirring was turned up to 200 rpm and the subsurface nitrogen purge was started. To the reaction was then added 30.0 g of lauryl methacrylate, 270.0 g of 2-Ethylhexyl Methacrylate and 129.9 g of acetone. The reaction was heated up to 43° C. by using a temperature controlled water batch set at 45° C. Once the reaction reached 43° C., 0.04 g of t-butyl hydroperoxide in 7.5 g of water was added. After 5 minutes, 0.29 g of sodium ascorbate dissolved in 7.5 g of water and 0.60 g of a 0.25% solution of iron sulfate hexahydrate was added. The nitrogen purge was then changed to a nitrogen blanket. The reaction was held an additional 5 hours, cooled to room temperature and isolated.

Example 8

To a 4-neck 2000 mL flask equipped with an overhead stirrer, a condenser, a thermocouple and a subsurface nitrogen purge was added 645.5 g of water and 8.7 g of Aerosol® OT. The stirring was turned up to 200 rpm and the subsurface nitrogen purge was started. To the reaction was then added 15.0 g of lauryl methacrylate, 285.0 g of 2-Ethylhexyl Methacrylate and 129.9 g of acetone. The reaction was heated up to 43° C. by using a temperature controlled water batch set at 45° C. Once the reaction reached 43° C., 0.04 g of t-butyl hydroperoxide in 7.5 g of water was added. After 5 minutes, 0.29 g of sodium ascorbate dissolved in 7.5 g of water and 0.60 g of a 0.25% solution of iron sulfate hexahydrate was added. The nitrogen purge was then changed to a nitrogen blanket. The reaction was held an additional 5 hours, cooled to room temperature and isolated.

Preparation of 5% Solids Solution of Copolymer in Oil

To a 4-neck 1000 mL flask equipped with an overhead stirrer, a Barrett distillation trap with a condenser and a thermocouple was added an amount of the emulsion of any of Examples 1-8 to give 20.0 g of polymer. Neutral Solvent 600 was then added to bring the total up to 400.0 g, followed by 150.0 g of toluene. The stirring was turned up to 200 rpm and the mixture was brought up to reflux. As water condensed in the Barrett trap it was drained off. Once the water stopped overflowing, the contents of the reactor were brought up to 130° C. to distill of a majority of the toluene. The remaining material was transferred to a 1000 mL single neck round bottom and concentrated at vacuum with a bath at 60° C. until the material reached a constant weight.

Method for Determining Molecular Weight and Radius of Gyration

The Molecular Weight and Radius of Gyration of the polymer samples, supplied at 5% solids in base oil, was determined by the procedure outlined below:

Eluant: HPLC Grade Tetrahydrofuran stabilized with 0.01% Butylated Hydroxytoluene Column: Phenogel Column 100A 10 um 300 mm×7.8 mm.

Flow Rate: 0.50 ml/min.

Detectors: Wyatt Dawn Heleos-II MultiAngle Light Scattering (MALS) at 663 nm and room temperature and Wyatt Optilab T-rEX Refractive Index Detector at 658 nm and 40° C.

Pump/Autosampler: Agilent 1100 Isocratic HPLC Pump and Autosampler

Column Compartment: 40° C.

Standards: There were no standards directly correlated with the analysis, but the Heleos-II MALS calibration constant was established with Toluene and the Optilab T-rEX calibration constant was established with NaCl in water. The 17 angles on the Heleos-II were normalized with a narrow range polystyrene standard at 28,500 Molecular Weight and the detector delay volume was adjusted with the same standard.

Sample Preparation: The samples were prepared by gravimetrically diluting about 8.0 mg of sample with about 5.0 g of tetrahyrofuran. The actual concentration of polymer in mg/ml was calculated based on the density of tetrahydrofuran (0.889 g/ml) and the percentage solids in the sample solutions (5.0% by weight).

Injection: 50 µl.

Run time: 20 minutes.

Software: Wyatt Astra Version 6.1.4.25.

Calculations: The Astra software provides several choices of formalisms and exponent order to fit the data. All samples were fit with a $2^{nd}$ order Berry. The angles used were adjusted to give the best fit, using a minimum of 13 angles and up to the maximum of 17. The do/dc was calculated from the refractive index data assuming 100% recovery. The software reported the average Molecular Weight as Mw and the average Root Mean Square Radius of Gyration as Rg. The results are shown in Table 2.

Method for Determining Viscosity

The shear viscosity of the polymer samples, supplied at 5% solids in base oil, was determined by stress-controlled rheometer MCR 302, manufactured by Anton Paar GmbH, located at Anton Paar Strasse 20, 8054, Graz, Austria. The Double Gap System of Measurement was used for good accuracy (Instruction Manual, MCR Series, Modular Compact Rheometer MCR 52/102/302/502, page 50, Anton Parr, Graz, Austria, 2011). The temperature was set at 22° C. with the accuracy of 0.1° C. The shear rate was gradually increased from 1/sec to 100/sec with 10 points of viscosity reading per decade. At each of these points, 10 second equilibrium time was given before the reading, which lasted 3 seconds. The viscosity at 10/sec shear rate is shown in Table 2. Software for instrument control and data acquisition is RheoCompass™, version 1.13.445.

TABLE 1

| Example | LMA[1] | 2-EHMA[1] | Acetone[2] | TBHP[2] | Ascorbate[2] | FeSO4[2] (0.25%) | Aerosol OT[2] |
|---------|--------|-----------|------------|---------|--------------|------------------|---------------|
| 1       | 90     | 10        | 43.3       | 0.013   | 0.098        | 0.20             | 2.90          |
| 2       | 80     | 20        | 43.3       | 0.013   | 0.098        | 0.20             | 2.90          |
| 3       | 70     | 30        | 43.3       | 0.013   | 0.098        | 0.20             | 2.90          |
| 4       | 60     | 40        | 43.3       | 0.013   | 0.098        | 0.20             | 2.90          |
| 5       | 40     | 60        | 43.3       | 0.013   | 0.098        | 0.20             | 2.90          |
| 6       | 20     | 80        | 43.3       | 0.013   | 0.098        | 0.20             | 2.90          |
| 7       | 10     | 90        | 43.3       | 0.013   | 0.098        | 0.20             | 2.90          |
| 8       | 5      | 95        | 43.3       | 0.013   | 0.098        | 0.20             | 2.90          |
| NS600 Base Oil | — | — | — | — | — | — | — |

[1]Percentage of monomer as a mass percent of the total amount of monomer
[2]Weight percent based on the total amount of monomer LMA = lauryl methacrylate; 2-EHMA = 2-ethylhexyl methacrylate.

TABLE 2

Hydrodynamic Chromatography/MALS

| Example | LMA[1] | 2-EHMA[1] | Mw Peak 1 ($10^6$ g/mol) | Mw Peak 2 ($10^6$ g/mol) | Rg Peak 1 (nm) | Rg Peak 2 (nm) | 5% S NS600 viscosity [mPa · s] | Finger Pull Test[2] |
|---------|--------|-----------|--------------------------|--------------------------|----------------|----------------|--------------------------------|---------------------|
| 1       | 90     | 10        | 133                      | 6.4                      | 140            | 108            | 3610                           | l                   |
| 2       | 80     | 20        | 133                      | 7.0                      | 135            | 104            | 2152                           | l                   |
| 3       | 70     | 30        | 146                      | 7.0                      | 132            | 106            | 2572                           | m                   |
| 4       | 60     | 40        | 169                      | 9.7                      | 135            | 119            | 2294                           | m                   |
| 5       | 40     | 60        | 129                      | 8.1                      | 133            | 111            | 4865                           | l                   |
| 6       | 20     | 80        | 132/131                  | 8.1/7.6                  | 152/152        | 122/120        | 4089                           | l                   |
| 7A[3]   | 10     | 90        | 92                       | 5.3                      | 166            | 101            | 8213                           | l                   |

TABLE 2-continued

Hydrodynamic Chromatography/MALS

| Example | LMA[1] | 2-EHMA[1] | Mw Peak 1 ($10^6$ g/mol) | Mw Peak 2 ($10^6$ g/mol) | Rg Peak 1 (nm) | Rg Peak 2 (nm) | 5% S NS600 viscosity [mPa·s] | Finger Pull Test[2] |
|---|---|---|---|---|---|---|---|---|
| 7B | 10 | 90 | 136/149 | 6.4/7.2 | 176/176 | 112/118 | 10600 | l |
| 8 | 5 | 95 | 36 | 5.4 | 192 | 112 | 41083 | vl |
| NS600 Base Oil | — | — | — | — | — | — | 300 | vs |

[1]Percentage of monomer as a mass percent of the total amount of monomer LMA = lauryl methacrylate; 2-EHMA = 2-ethylhexyl methacrylate;
[2]vs = very short, s = short, m = medium, l = long, vl = very long
[3]Two duplicate samples for Example 7 were created using the Example 7 preparation method described

What is claimed is:

1. An uncrosslinked copolymer of alkyl methacrylate monomers wherein said alkyl methacrylate monomers comprise:
   a. Monomers (A) selected from C6-C10 alkyl methacrylate monomers, and
   b. Monomers (B) selected from C10-C18 alkyl methacrylate monomers, wherein the mass ratio of Monomers (B) in the copolymer to Monomers (A) in the copolymer is 99:1 to 60:40 by weight, wherein Monomers (A) and Monomers (B) are distinct from one another, wherein the copolymer contains not more than 3.0% by weight of a methyl methacrylate repeating unit, and wherein the copolymer is a substantially random copolymer and has an average root mean square radius of gyration from 100 nm to 200 nm as measured by hydrodynamic column chromatography-multi angle light scattering where tetrahydrofuran is used as a solvent,
   wherein the copolymer has a weight average molecular weight of from 5,300,000 to 169,000,000 g/mol.

2. The copolymer of claim 1 wherein the mass ratio of the Monomers (A) and the Monomers (B) is about 80:20 Monomers (B) to Monomers (A).

3. The copolymer of claim 1 wherein the mass ratio of the Monomers (A) and the Monomers (B) is about 90:10 Monomers (B) to Monomers (A).

4. The copolymer of claim 1 wherein Monomers (B) are lauryl methacrylate.

5. The copolymer of claim 1 wherein Monomers (A) are $C_8$ alkyl methacrylate.

6. The copolymer of claim 5 wherein the $C_8$ alkyl methacrylate is 2-ethyl hexyl methacrylate.

7. The copolymer of claim 1 wherein Monomers (A) and Monomers (B) represent at least 75% by weight of the total weight of monomers used to prepare the copolymer.

8. The copolymer of claim 7 wherein the Monomers (A) and Monomers (B) represent at least 90% by weight of the total weight of monomers used to prepare the copolymer.

9. The copolymer of claim 7 wherein Monomers (A) and Monomers (B) represent at least 99% by weight of the total weight of monomers used to prepare the copolymer.

10. The copolymer of claim 1 wherein the copolymer comprises C12 alkyl methacrylate repeating units, C14 alkyl methacrylate repeating units, C16 alkyl methacrylate repeating units, C18 alkyl methacrylate repeating units and C8 alkyl methacrylate repeating units.

11. The copolymer of claim 1 wherein the copolymer contains not more than 1.0% by weight of methyl methacrylate repeating units.

12. The copolymer of claim 1 wherein the copolymer contains not more than 0.5% by weight of methyl methacrylate repeating units.

13. The copolymer of claim 1 wherein the copolymer has a weight average molecular weight of at least 6,400,000 g/mol and up to 169,000,000 g/mol.

14. An uncrosslinked copolymer of $C_8$ alkyl methacrylate and lauryl methacrylate, wherein the mass ratio of lauryl methacrylate monomers in the copolymer to $C_8$ alkyl methacrylate monomers in the copolymer is 99:1 to 60:40 by weight, and wherein the copolymer is a substantially random copolymer and has an average root mean square radius of gyration from 100 nm to 200 nm as measured by hydrodynamic column chromatography-multi angle light scattering where tetrahydrofuran is used as a solvent,
    wherein the copolymer has a weight average molecular weight of from 5,300,000 to 169,000,000 g/mol.

15. The uncrosslinked copolymer of claim 1 wherein Monomers (B) are lauryl methacrylate and wherein Monomers (A) are 2-ethyl hexyl methacrylate and wherein the copolymer has a weight average molecular weight of from 5,300,000 to 92,000,000 g/mol.

16. The uncrosslinked copolymer of claim 1 wherein Monomers (B) are lauryl methacrylate and wherein Monomers (A) are 2-ethyl hexyl methacrylate and wherein the copolymer has a weight average molecular weight of from 6,400,000 to 149,000,000 g/mol.

17. The uncrosslinked copolymer of claim 1 wherein Monomers (B) are lauryl methacrylate and wherein Monomers (A) are 2-ethyl hexyl methacrylate and wherein the copolymer has a weight average molecular weight of from 7,600,000 to 132,000,000 g/mol.

18. The uncrosslinked copolymer of claim 1 wherein Monomers (B) are lauryl methacrylate and wherein Monomers (A) are 2-ethyl hexyl methacrylate and wherein the copolymer has a weight average molecular weight of from 8,100,000 to 129,000,000 g/mol.

19. The uncrosslinked copolymer of claim 1 wherein Monomers (B) are lauryl methacrylate and wherein Monomers (A) are 2-ethyl hexyl methacrylate and wherein the copolymer has a weight average molecular weight of from 6,400,000 to 146,000,000 g/mol.

20. The uncrosslinked copolymer of claim 1 wherein Monomers (B) are lauryl methacrylate and wherein Monomers (A) are 2-ethyl hexyl methacrylate and wherein the copolymer has a weight average molecular weight of from 9,700,000 to 169,000,000 g/mol.

* * * * *